(12) United States Patent
Copia

(10) Patent No.: US 7,134,751 B1
(45) Date of Patent: Nov. 14, 2006

(54) LENS TETHER

(76) Inventor: Joey Copia, 2388 Lake Heather Heights Ct., Dunedin, FL (US) 34698

( * ) Notice: Subject to any disclaimer, the term of this patent is extended or adjusted under 35 U.S.C. 154(b) by 0 days.

(21) Appl. No.: 11/101,540

(22) Filed: Apr. 6, 2005

(51) Int. Cl.
*G02C 7/08* (2006.01)
(52) U.S. Cl. .............................. 351/57; 351/47; 351/111
(58) Field of Classification Search ................. 351/41, 351/44, 47, 48, 57, 58, 111; D16/900
See application file for complete search history.

(56) References Cited

U.S. PATENT DOCUMENTS

| 5,005,263 A | 4/1991 | Barrett |
|---|---|---|
| 5,557,345 A | 9/1996 | Katzenmeyer |
| 5,956,812 A | 9/1999 | Moennig |
| 6,783,238 B1 * | 8/2004 | Stepper ...................... 351/178 |

FOREIGN PATENT DOCUMENTS

JP          61-57923       *  3/1986   ................. 351/47

\* cited by examiner

*Primary Examiner*—Huy Mai

(57) ABSTRACT

A visual acuity system is disclosed. The system comprises a pair of eyeglasses, or in the alternative, a pair of sunglasses. The pair of eyeglasses or sunglasses has a metallic frame so that a magnetic "clip-on" lens can be attached by only using magnetic attachment means. Furthermore, a coiled spring is used to connect the "clip-on" lens to the pair of eyeglasses or sunglasses so that even when the clip-on lens is not in use, it will be in close proximity to the eyeglasses or sunglasses. The coiled spring will also prevent the clip-on lens from becoming lost.

6 Claims, 1 Drawing Sheet

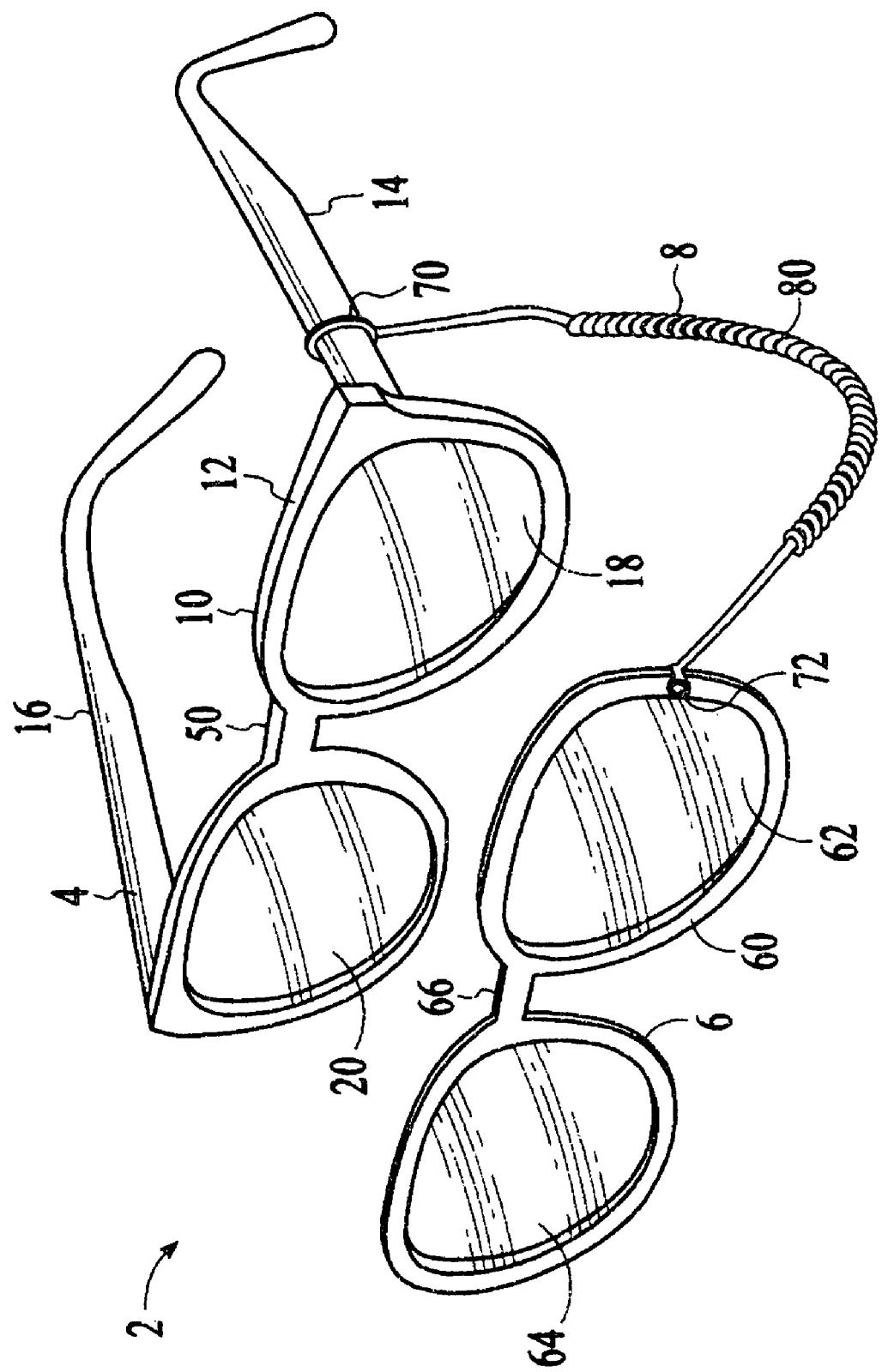

LENS TETHER

I. BACKGROUND OF THE INVENTION

The present invention concerns that of a new and improved visual acuity system.

II. DESCRIPTION OF THE PRIOR ART

U.S. Pat. No. 5,956,812, issued to Moennig, discloses an eyeglass holder comprising a flexible strand and clip for attachment to an article of clothing.

U.S. Pat. No. 5,557,345, issued to Katzenmeyer, discloses means for tethering a pair of glasses for attachment to the ear of a user.

U.S. Pat. No. 5,005,263, issued to Barrett, discloses an eyeglass support comprised of a flexible member with a clip.

III. SUMMARY OF THE INVENTION

The present invention concerns that of a new and improved visual acuity system. The system comprises a pair of eyeglasses, or in the alternative, a pair of sunglasses. The pair of eyeglasses or sunglasses has a metallic frame so that a magnetic "clip-on" lens can be attached by only using magnetic attachment means. Furthermore, a coiled spring is used to connect the "clip-on" lens to the pair of eyeglasses or sunglasses so that even when the clip-on lens is not in use, it will be in close proximity to the eyeglasses or sunglasses. The coiled spring will also prevent the clip-on lens from becoming lost.

There has thus been outlined, rather broadly, the more important features of a visual acuity system that the detailed description thereof that follows may be better understood and in order that the present contribution to the art may be better appreciated. There are, of course, additional features of the visual acuity system that will be described hereinafter and which will form the subject matter of the claims appended hereto.

In this respect, before explaining at least one embodiment of the visual acuity system in detail, it is to be understood that the visual acuity system is not limited in its application to the details of construction and to the arrangements of the components set forth in the following description or illustrated in the drawings. The visual acuity system is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present visual acuity system. It is important, therefore, that the claims be regarded as including such equivalent constructions insofar as they do not depart from the spirit and scope of the present invention.

It is therefore an object of the present invention to provide a visual acuity system which has all of the advantages of the prior art and none of the disadvantages.

It is another object of the present invention to provide a visual acuity system which may be easily and efficiently manufactured and marketed.

It is another object of the present invention to provide a visual acuity system which is of durable and reliable construction.

It is yet another object of the present invention to provide a visual acuity system which is economically affordable and available for relevant market segment of the purchasing public.

Other objects, features and advantages of the present invention will become more readily apparent from the following detailed description of the preferred embodiment when considered with the attached drawings and appended claims.

IV. BRIEF DESCRIPTION OF THE DRAWINGS

FIG. 1 shows a perspective view of the visual acuity system.

V. DESCRIPTION OF THE PREFERRED EMBODIMENT

FIG. 1 shows a perspective view of the visual acuity system 2. System 2 comprises a pair of glasses 4, a lens attachment device 6, and a coiled spring 8 that is used to connect the pair of glasses 4 and the lens attachment device 6 to one another.

The pair of glasses 4 are preferably a pair of eyeglasses, but can also be a pair of sunglasses, especially if the pair of sunglasses are a pair of prescription sunglasses in which the lens have been modified for a particular person. The only difference between whether the pair of glasses 4 is a pair of eyeglasses or a pair of sunglasses is essentially the transparency of the lens used with either one.

The pair of glasses 4 comprises a frame 10, which further comprises a lens holder portion 12 that has two ends, a left end and a right end. The frame also has two surfaces, a front surface and a rear surface. A left arm 14 is pivotally attached to the left end of the lens holder portion 12, while a right arm 16 is pivotally attached to the left end of the lens holder portion 12. The lens holder portion 12 has a left lens 18 and a right lens 20 integrally connected to it.

Frame 10 itself is fabricated, at least in part, from a metal 50 that is capable of retaining magnetic qualities. The frame 10 need not be entirely metallic, but needs to hold enough magnetic power to sufficiently allow the lens attachment device 6 to be removably attached to the frame 10.

Generally, the lens 18 and 20 will be specifically tailored to a particular individual's eyesight needs. However, the particular characteristics of the lens 18 and 20 may be valid only in certain situations, and in other situations, may still cause eyesight problems or inaccuracies that may cause people to not see correctly. Therefore, the individual can use lens attachment device 6 in conjunction with the pair of glasses 4.

Lens attachment device 6 has two surfaces, a front surface and a rear surface, and comprises a frame 60. The frame 60 includes a left lens 62 and a right lens 64 integrally connected to it. Frame 60 itself is fabricated, at least in part, from a metal 66 that is capable of retaining magnetic qualities. The frame 60 need not be entirely metallic, but needs to hold enough magnetic power to sufficiently allow the lens attachment device 6 to be removably attached to the frame 10 of the pair of eyeglasses 4.

To insure that the lens attachment device 6 is always around when needed in conjunction with a pair of eyeglasses 4, a coiled spring 8 is used to removably connect these two components of the visual acuity system 2. Coiled spring 8 has two ends, a first end and a second end. The first end of the coiled spring 8 has an elastic ring 70 that is designed to be removably attached over either arm of the pair of eyeglasses 2. The elastic ring 70 is tight enough to hold onto the thin wire arms, yet at the same time, flexible enough to stretch over arms that may vary in shape and configuration between different pairs of eyeglasses.

The second end of coiled spring 8 preferably ends in a magnetic disc 72 which is removably attached to the frame 60 of the lens attachment device 6. The magnetic disc 72 acts as a clamp and allows a removable attachability between the coiled spring 8 and the lens attachment device 6 if the coiled spring 8 is in fact not needed.

The majority of the length of the coiled spring 8 has a long, continuous coil 80 in it. The coiled spring 8 itself is preferably made from a clear material and is made of monofilament.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A device for tethering lenses comprising:
   a pair of glasses, the pair of glasses including a frame, the frame including a lens holder portion, the lens holder portion having two ends, a left end and a right end, the pair of glasses further including a pair of arms comprising a left arm and a right arm, the left arm being pivotally attached to the left end of the lens holder portion, the right arm being pivotally attached to the right end of the lens holder portion, the pair of glasses further comprising a pair of lenses comprising a left lens and a right lens, wherein each of the lens are integrally connected with the lens holder portion, further wherein the frame is fabricated at least in part from metal, the metal having magnetic qualities,
   a lens attachment device having two surfaces, a front surface and a rear surface, the lens attachment device further comprising a frame, the frame including a pair of lenses comprising a left lens and a right lens, each of the lens being integrally connected with the frame, further wherein the frame is fabricated at least in part from metal, the metal having magnetic qualities, and
   an attachment mechanism for connecting the pair of glasses to the lens attachment device when the lens attachment device is not being used,
   wherein the attachment mechanism for connecting the pair of glasses to the lens attachment device when the lens attachment device is not being used further comprises a coiled spring having two ends, a first end and a second end, wherein the first end of the coiled spring attached to an arm of the pair of glasses, and further wherein the second end of the coiled spring being removably attached to the lens attachment device.

2. A device for tethering lenses according to claim 1 wherein the coiled spring further comprises an elastic ring attached to the first end of the coiled spring.

3. A device for tethering lenses according to claim 2 wherein the coiled spring further comprises a magnetic disc attached to the second end of the coiled spring.

4. A device for tethering lenses according to claim 3 wherein the coiled spring further comprises a coil that spans most of the length of the coiled spring.

5. A device for tethering lenses according to claim 4 wherein the pair of glasses comprises a pair of eyeglasses.

6. A device for tethering lenses according to claim 4 wherein the pair of glasses comprises a pair of sunglasses.

* * * * *